US011207947B2

(12) United States Patent
Allgaeuer et al.

(10) Patent No.: US 11,207,947 B2
(45) Date of Patent: Dec. 28, 2021

(54) COOLING SYSTEM FOR A MOTOR VEHICLE AND MOTOR VEHICLE HAVING SUCH A COOLING SYSTEM

(71) Applicant: Bayerische Motoren Werke Aktiengesellschaft, Munich (DE)

(72) Inventors: Christian Allgaeuer, Munich (DE); Marion Mack, Munich (DE); Markus Moser, Oberschleissheim (DE)

(73) Assignee: Bayerische Motoren Werke Aktiengesellschaft, Munich (DE)

(*) Notice: Subject to any disclaimer, the term of this patent is extended or adjusted under 35 U.S.C. 154(b) by 0 days.

(21) Appl. No.: 16/764,039

(22) PCT Filed: Nov. 9, 2018

(86) PCT No.: PCT/EP2018/080788
§ 371 (c)(1),
(2) Date: May 14, 2020

(87) PCT Pub. No.: WO2019/096696
PCT Pub. Date: May 23, 2019

(65) Prior Publication Data
US 2020/0276882 A1    Sep. 3, 2020

(30) Foreign Application Priority Data
Nov. 15, 2017 (DE) ............ 10 2017 220 376.5

(51) Int. Cl.
*F25B 27/00* (2006.01)
*B60H 1/14* (2006.01)
*B60H 1/00* (2006.01)

(52) U.S. Cl.
CPC ......... *B60H 1/143* (2013.01); *B60H 1/00278* (2013.01); *B60H 2001/00928* (2013.01)

(58) Field of Classification Search
CPC ............... B60H 1/143; B60H 1/00278; B60H 2001/00928
(Continued)

(56) References Cited

U.S. PATENT DOCUMENTS

2007/0157647 A1    7/2007    Duhme et al.
2010/0009246 A1    1/2010    Maitre et al.
(Continued)

FOREIGN PATENT DOCUMENTS

DE    10 2004 035 879 A1    2/2006
DE    10 2009 021 530 A1    1/2010
(Continued)

OTHER PUBLICATIONS

International Search Report (PCT/ISA/210) issued in PCT Application No. PCT/EP2018/080788 dated Mar. 11, 2019 with English translation (six pages).
(Continued)

*Primary Examiner* — Davis D Hwu
(74) *Attorney, Agent, or Firm* — Crowell & Moring LLP

(57) ABSTRACT

A cooling system for a motor vehicle has an electrical energy storage device for driving the motor vehicle; a chiller through which a refrigeration circuit and, fluidically separated therefrom, a main cooling circuit can flow; one or more control elements; at least one heat source, and one or more ambient air coolers. In a first mode, the control elements form the main cooling circuit such that the main cooling circuit can flow through the chiller, the energy storage device and none of the ambient air coolers. In a second mode, the control elements form the main cooling circuit such that the main cooling circuit can flow through the chiller, the energy storage device and at least one of the ambient air coolers. In a third mode, the control elements form the main cooling circuit such that the main cooling
(Continued)

circuit can flow through the chiller, at least one of the ambient air coolers and the heat source.

8 Claims, 4 Drawing Sheets

(58) Field of Classification Search
USPC .......................................................... 62/238.1
See application file for complete search history.

(56) References Cited

U.S. PATENT DOCUMENTS

| | | | |
|---|---|---|---|
| 2012/0085512 A1* | 4/2012 | Graaf | B60L 58/26 165/51 |
| 2012/0291987 A1 | 11/2012 | Himmer et al. | |
| 2013/0025311 A1* | 1/2013 | Graaf | B60H 1/00271 62/238.7 |
| 2014/0075966 A1* | 3/2014 | Schmitz | B60H 1/00921 62/56 |
| 2015/0217623 A1* | 8/2015 | Hatakeyama | B60L 58/13 165/42 |
| 2017/0211462 A1* | 7/2017 | Chen | F02B 29/0493 |
| 2018/0319246 A1 | 11/2018 | Allgaeuer et al. | |

FOREIGN PATENT DOCUMENTS

| | | |
|---|---|---|
| DE | 10 2009 054186 A1 | 5/2011 |
| DE | 10 2010 042 122 A1 | 4/2012 |
| DE | 10 2011 016 070 A1 | 10/2012 |
| DE | 10 2016 200 362 A1 | 7/2017 |

OTHER PUBLICATIONS

German-language Written Opinion (PCT/ISA/237) issued in PCT Application No. PCT/EP2018/080788 dated Mar. 11, 2019 (nine pages).
German-language Search Report issued in German Application No. 10 2017 220 376.5 dated Aug. 6, 2018 with partial English translation (13 pages).

* cited by examiner

COOLING SYSTEM FOR A MOTOR VEHICLE AND MOTOR VEHICLE HAVING SUCH A COOLING SYSTEM

BACKGROUND AND SUMMARY OF THE INVENTION

The invention relates to a cooling system for a motor vehicle having an electrical energy storage device for driving the vehicle, and to a motor vehicle having such a cooling system.

The following possibilities are currently usual for the cooling of an electrical energy storage device in a hybrid or electric vehicle. Thus, it is possible to cool the electrical energy storage device by air cooling by means of ambient air or by means of air conditioned via the refrigeration circuit. A further possibility is coolant cooling, in which the energy storage device is cooled by coolant. The coolant is conditioned by an ambient air cooler or the refrigeration circuit, wherein what is known as a chiller is required in the latter. A chiller is a coolant-refrigerant heat exchanger, in which heat energy is transferred between a cooling circuit and a refrigeration circuit, which are separated fluidically from each other. A further possibility for energy storage device cooling is direct refrigerant cooling, in which the energy storage device is cooled directly by the refrigeration circuit, i.e. the refrigerant evaporates in evaporator plates, which are arranged directly on the energy storage device cell modules.

The disadvantage with this prior art consists in the fact that cooling the energy storage device without the assistance of a refrigeration circuit, in particular at high ambient temperatures, does not have sufficient power. In particular this is true for the use cases of fast DC charging, dynamic driving maneuvers or high driving speeds.

If cooling is carried out by means of the refrigeration circuit, then the refrigeration circuit provides the refrigeration power both for the cooling of the interior and for the cooling of the energy storage device. Because of the increased cooling demands of the energy storage device, in some operating states (e.g. high driving speeds, fast DC charging) the refrigeration power is insufficient. In addition, it is necessary to take into account the fact that for the actual cooling power for the purpose of cooling, the power of the electrical refrigerant compressor has to be dissipated via the cooling system, which leads to additional loading of the overall cooling system (if, for example, in an energy storage cooling power of 2 kW, a power of the refrigerant compressor 1 kW is incurred, then the result is 3 kW of condenser power). Therefore, cooling the energy storage device by means of a refrigeration circuit is not energy-efficient in every operating state.

It is an object of the present invention to provide an improved, in particular more efficient, cooling system for a motor vehicle which has an electrical energy storage device.

This object is achieved by a cooling system and by a motor vehicle having the cooling system in accordance with the claimed invention.

According to an exemplary embodiment of the invention, a cooling system for a motor vehicle is provided, having: an electrical energy storage device for driving the motor vehicle; a chiller, through which a refrigeration circuit and, separated fluidically therefrom, a main cooling circuit can flow, in order to transfer heat energy between the refrigeration circuit and the main cooling circuit; one or more control elements; at least one heat source; and one or more ambient air coolers, wherein, in a first mode, the control elements form the main cooling circuit such that the main cooling circuit can flow through the chiller, the energy storage device and none of the ambient air coolers; in a second mode, the control elements form the main cooling circuit such that the main cooling circuit can flow through the chiller, the energy storage device and at least one of the ambient air coolers, and in a third mode, the control elements form the main cooling circuit such that the main cooling circuit can flow through the chiller, at least one of the ambient air coolers and the heat source. This exemplary embodiment has the advantage that an ambient air cooler, a chiller and an electrical energy storage device can each be connected to one another differently as required, so that cooling which meets the demand and is energy-efficient is made possible.

According to a further exemplary embodiment of the invention, in the third mode, the chiller is arranged downstream of the heat source and upstream of the at least one ambient air cooler. Since the chiller is arranged downstream of potential heat sources, the waste heat from these heat sources can be transferred into the refrigeration circuit via the chiller and thus be available for possible heat pump applications for energy-efficient heating of the interior and/or the energy storage device. Since the chiller is arranged upstream of the ambient air cooler, the coolant can be cooled below ambient temperature and thus heat from the surroundings can be absorbed into the main cooling circuit and transferred into the refrigeration circuit by means of the chiller and thus be available for possible heat pump applications for the energy-efficient heating of the interior and/or the energy storage device. However, this invention concentrates on the heat-absorbing side, there being many possible configurations for connecting the refrigeration circuit on the heat-emitting side.

According to a further exemplary embodiment of the invention, a first control element is a three-way valve, of which a first inlet can be connected to an outlet of the heat source, a second inlet can be connected at least to an outlet of the chiller, and an outlet can be connected to an inlet of at least one of the ambient air coolers.

According to a further exemplary embodiment of the invention, a second control element is a three-way valve, of which a first inlet can be connected to an outlet of at least one of the ambient air coolers, a second inlet can be connected at least to an outlet of the heat source, and an outlet to an inlet of the chiller.

According to a further exemplary embodiment of the invention, in the first mode and/or in the second mode, the control elements additionally form a secondary cooling circuit, which can flow through the heat source and at least one of the ambient air coolers.

According to a further exemplary embodiment of the invention, in the first mode, an exchange of coolant between the main cooling circuit and the secondary cooling circuit is substantially suppressed.

According to a further exemplary embodiment of the invention, in the second mode, the main cooling circuit opens into the secondary cooling circuit downstream of the energy storage device, so that the main cooling circuit and the secondary cooling circuit partly overlap.

According to a further exemplary embodiment of the invention, a check valve is provided downstream of the energy storage device.

According to a further exemplary embodiment of the invention, the heat source is at least one element from the group which comprises the following: an electronic component, in particular a power electronic component, an electric machine, in particular an electric motor and/or a generator, an internal combustion engine, at least one secondary unit of the internal combustion engine, a coolant-air heat exchanger of a rear ventilation system (which, for example, can be arranged in the rear ventilation system for energy recovery from the interior air), and an electric heater.

Furthermore, the present invention provides a motor vehicle having such a cooling system.

A preferred exemplary embodiment of the present invention will be described below with reference to the appended drawings.

DETAILED DESCRIPTION OF THE DRAWINGS

Figure 1:
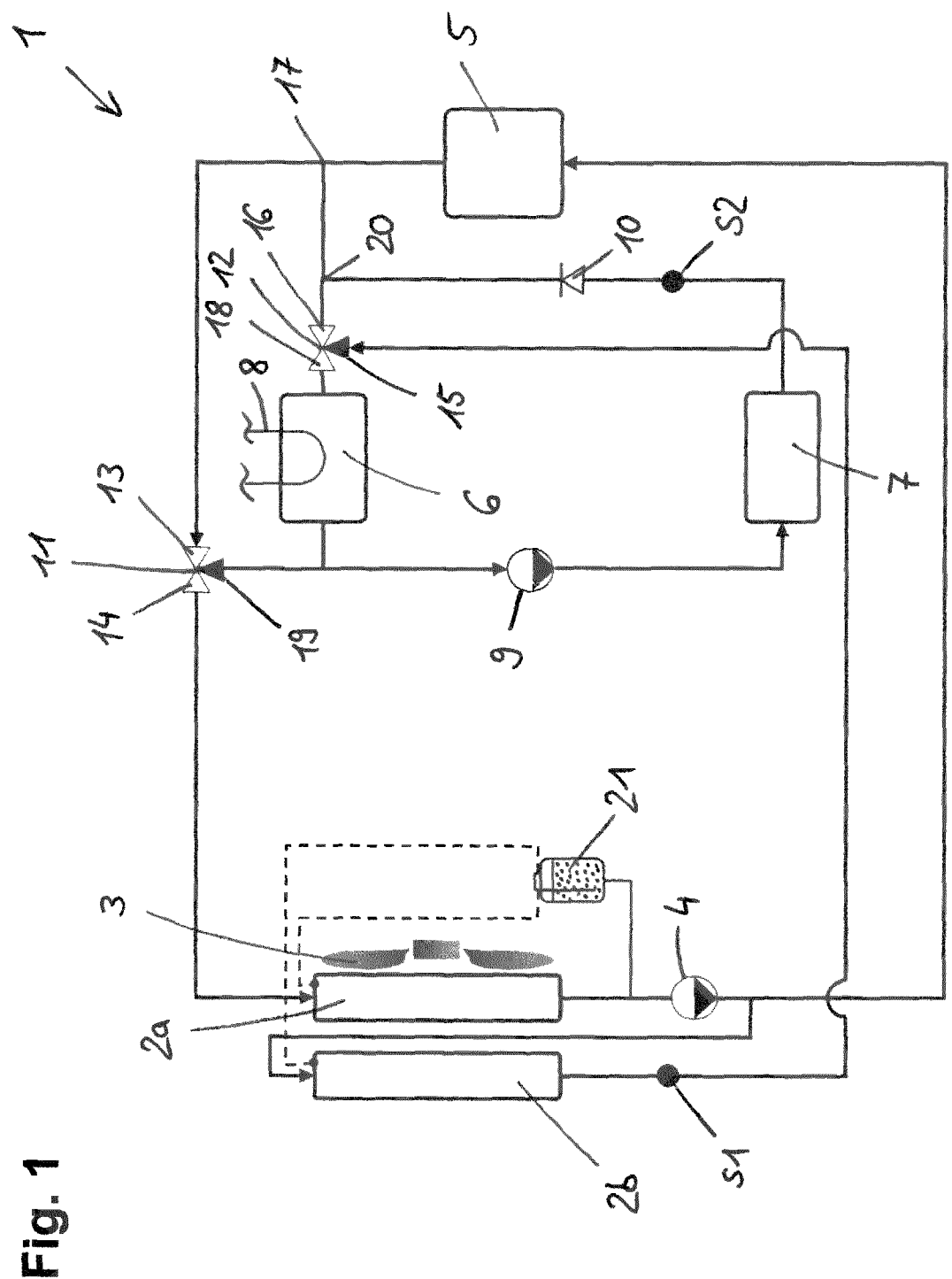
FIG. 1 shows a cooling system according to the invention according to an exemplary embodiment.

FIG. 1 shows a cooling system 1 according to an exemplary embodiment. The cooling system 1 is in particular for a motor vehicle application driven electrically from time to time or wholly, in particular for a hybrid or electric vehicle. The cooling system 1 has a first ambient air cooler 2a and a second ambient air cooler 2b, to which an electric blower 3 is assigned. Furthermore, the cooling system 1 has a first coolant pump 4, a heat source 5, a chiller 6 and an electrical energy storage device 7. The heat source 5 can be one or more elements from the following group, which comprises: an electronic component (for example a power electronic component), an electric machine (for example an electric motor and/or a generator), an internal combustion engine, at least one secondary unit of the internal combustion engine, a coolant-air heat exchanger of a rear ventilation system (which, for example, can be arranged in the rear ventilation system for energy recovery from the interior air), and an electric heater. The chiller 6 is a refrigerant-coolant heat exchanger, which can transfer heat energy between the refrigerant and the coolant, which are separated fluidically from each other. Designation 8 thereby indicates a refrigeration circuit, which flows through the chiller 6, wherein the refrigeration circuit 8 is separated fluidically from a main cooling circuit, which likewise flows through the chiller 6. The energy storage device 7 is an electrical energy storage device, which is used to drive the motor vehicle, in particular comprising lithium-ion cells.

Furthermore, the cooling system 1 has a second coolant pump 9, a check valve 10, a first control element 11 and a second control element 12. The first control element 11 and the second control element 12 are each three-way valves. In particular, the three-way valves in the present exemplary embodiment are installed in such a way that they form two inlets and an outlet.

In the following, the interconnection of the aforementioned components will be described, wherein the term "connected" represents a fluidically conductive line, for example in the form of hoses or pipes, of the cooling system. An outlet of the first ambient air cooler 2a is connected to an inlet of the first coolant pump 4. Downstream of the outlet of the first coolant pump, a coolant line branches, wherein one coolant strand leads to an inlet of the second ambient air cooler 2b, and the other coolant strand leads to an inlet of the heat source 5. The outlet of the heat source 5 is connected to a first inlet 13 of the first control element 11. An outlet 14 of the first control element is in turn connected to the inlet of the first ambient air cooler 2a. An outlet of the second ambient air cooler 2b is connected to a first inlet 15 of the second control element 12. Designation S1 thereby identifies a first temperature measuring point downstream of the second ambient air cooler 2b and upstream of the second control element 12. A second inlet 16 of the second control element 12 is connected at a junction 17 to the line leading from the outlet of the heat source 5 to the first inlet 13 of the first control element 11. An outlet 18 of the second control element 12 is connected to the inlet of the chiller 6. The outlet of the chiller 6 branches, firstly to a second inlet 19 of the first control element 11 and, secondly, to an inlet of the second coolant pump 9. The outlet of the second coolant pump 9 leads to an inlet of the energy storage device 7, an outlet of the energy storage device 7 leads to a junction 20 at which a line coming from the outlet of the energy storage device 7 merges with the line which leads from the second inlet 16 of the second control element 12 to the junction 17. In the line which leads from the outlet of the energy storage device 7 to the junction 20, a check valve 10 is provided, which is connected such that only a flow in the direction from the outlet of the energy storage device 7 toward the junction 20 is permitted. Between an inlet of the check valve 10 and the outlet of the energy storage device 7, a temperature measuring point S2 is provided. The temperature measuring points S1 and S2 supply the temperature of the coolant flowing at this point by means of temperature sensors. An expansion tank bears designation 21 and is integrated into the cooling system 1 such that an outlet of the expansion tank 21 opens into the line which leads from the outlet of the first air cooler 2a to the inlet of the first coolant pump 4. The inlets of the expansion tank 21 are each connected to the ambient air coolers 2a, 2b. The ambient air coolers 2a, 2b can be formed, as illustrated, as two separate ambient air coolers or as a single ambient air cooler. In addition, they can be formed structurally as a single ambient air cooler which is subdivided internally.

As an alternative to the above-described structure, the coolant pump 9 can also be arranged in the line between the energy storage device 7 and the junction 20.

Furthermore, as an alternative to the above-described structure, the temperature measuring point S2 can also be arranged between the outlet of the check valve 10 and the junction 20.

In the following, three different operating states of the cooling system 1 will be described, wherein, in the respective operating states, lines through which flow takes place are illustrated as continuous lines and lines through which no flow takes place and lines with stationary coolant are illustrated as dotted lines. The two lines at the inlet of the expansion tank 21 are always illustrated as dashed lines, irrespective of their operating states or their throughflow.

Figure 2:
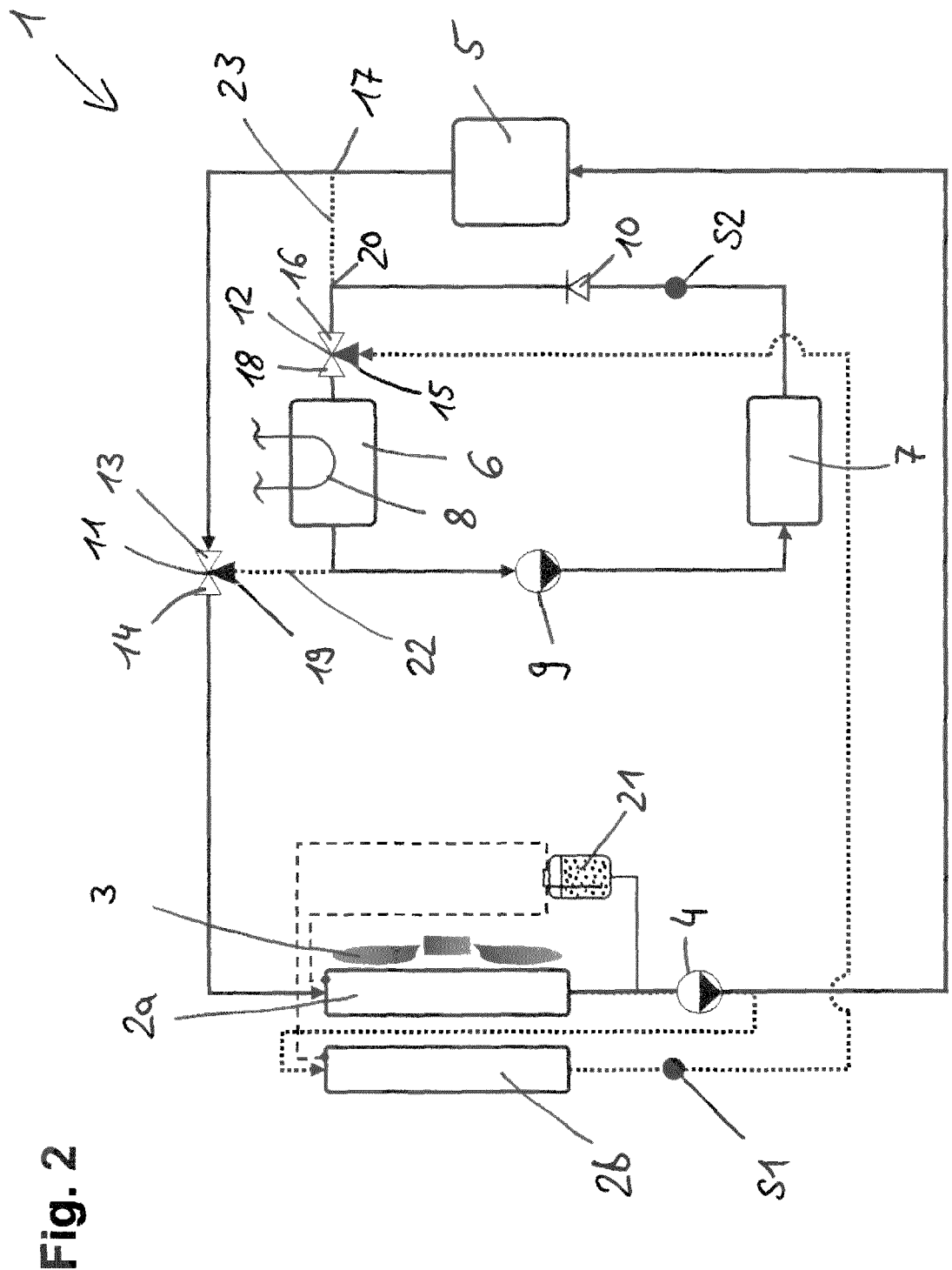
FIG. 2 illustrates a first mode of the cooling system from FIG. 1.

FIG. 2 illustrates a first mode. In this first mode, a main cooling circuit is formed, in which, in the order recited below, the coolant flows through the chiller 6, the second coolant pump 9, the energy storage device 7, the check valve 10 and the second control element 12, in order then to be fed back to the chiller 6 again.

Furthermore, in the first mode, a secondary cooling circuit is formed, in which, in the order recited below, the coolant flows through the first ambient air cooler 2a, the first coolant pump 4 and the heat source 5. From the heat source 5, the secondary cooling circuit leads back via the first control element 11 to the inlet of the first ambient air cooler 2a.

In order that the main cooling circuit and the secondary cooling circuit are formed, the first inlet 15 of the second control element 12 is blocked and the second inlet 16 is opened, so that the second control element 12 is switched through from the second inlet 16 to the outlet 18. In addition, the first control element 11 is switched such that the second inlet 19 is blocked and the first inlet 13 is opened, so that the first control element 11 switches through from the first inlet 13 to the outlet 14.

As a result of the blocking of the second inlet 19 of the first control element 11, no coolant flow takes place in the line section 22 illustrated dotted, so that no coolant can flow out of the main cooling circuit. Since no flow of coolant out of the main cooling circuit takes place, coolant cannot flow via the line section 23 illustrated dotted from the secondary cooling circuit into the main cooling circuit either. Consequently, substantially no coolant exchange takes place between the main cooling circuit and the secondary cooling circuit (of course, apart from a minimum exchange in the line 23 itself).

The first mode is chosen for example by an air conditioning controller, in particular when a coolant temperature at the temperature measuring point S2 is lower than a coolant temperature at the temperature measuring point S1, or when waste heat from the energy storage device 7 is to be used for a heat pump application, i.e. when the waste heat from the energy storage device 7 is to be introduced into the cooling circuit 8 via the chiller 6 in order to use the refrigeration circuit 8 for heating purposes.

If there is neither a cooling demand for the energy storage device 7 nor a heat pump demand, then the main cooling circuit can also be deactivated by the second coolant pump 9 being switched off. In such a case, only the secondary cooling circuit would be active and not the main cooling circuit, i.e. coolant would flow in the secondary cooling circuit, while the coolant is at a standstill in the main cooling circuit.

Figure 3:
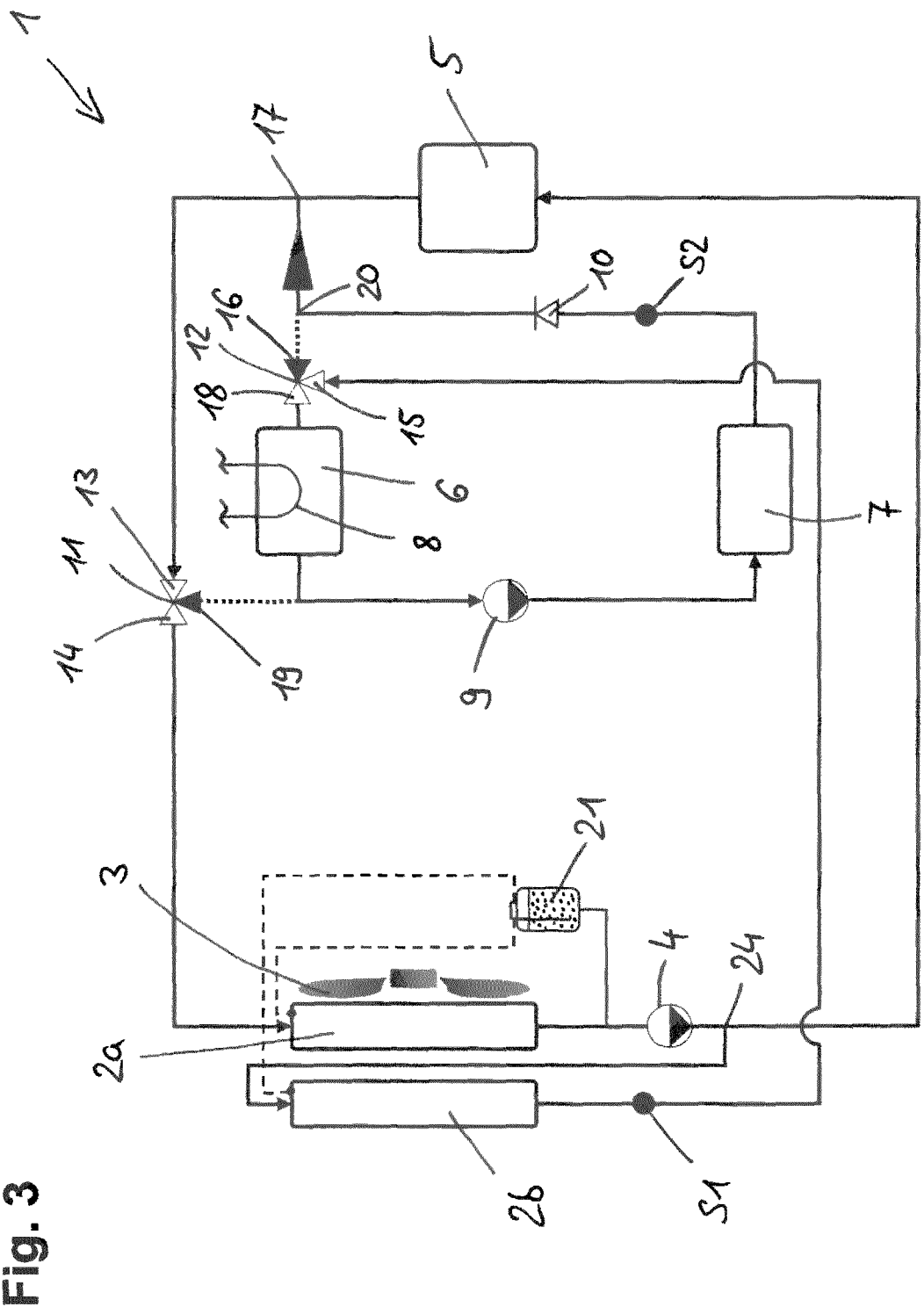
FIG. 3 illustrates a second mode of the cooling system from FIG. 1.

FIG. 3 illustrates a second mode. In the second mode, a secondary cooling circuit is formed, in which, in the order recited below, coolant flows through the first ambient air cooler 2a, the first coolant pump 4 and the heat source 5. From the heat source 5, the secondary cooling circuit leads via the first control element 11 back to the inlet of the first ambient air cooler 2a.

Furthermore, in the second mode, a main cooling circuit is formed, in which the coolant branches off at a junction 24 downstream of the first coolant pump 4 and upstream of the heat source 5 and, in the order recited below, flows through the second ambient air cooler 2b, the second control element 12, the chiller 6, the second coolant pump 9, the energy storage device 7 and the check valve 10, in order to flow back into the secondary cooling circuit at the junction 17. Between the junction 17 and the junction 24, the main cooling circuit and the secondary cooling circuit overlap.

In order that the secondary cooling circuit and the main cooling circuit are formed in the second mode, the first inlet 15 of the second control element 12 is opened and the second inlet 16 is blocked, so that second control element 12 is switched through from the first inlet 15 to the outlet 18. Furthermore, the first control element 12 is switched such that the second inlet 19 is blocked and the first inlet 13 is opened, so that the first control element 11 switches through from the first inlet 13 to the outlet 14.

In the second mode, the ambient air coolers 2a and 2b, the chiller 6 and the energy storage device 7 are arranged in series. The ambient air coolers 2a, 2b thus ensure the lowest possible temperature level in the main cooling circuit, which is then lowered further by the chiller 6, to which cold is additionally supplied by the refrigeration circuit 8. The second mode is expedient when the coolant temperature at the temperature measuring point S2 is higher than the coolant temperature at the temperature measuring point S1 and when no heat pump application is to be used. If the chiller 6 is active, the latter ensures additional supercooling of the coolant which comes from the second ambient air cooler 2b. As a result, particularly high-power and energy-efficient cooling of the energy storage device 7 is possible. In the second mode, it is also possible that, depending on the cooling power demand, although there is flow through the chiller 6, the flow is blocked off on the refrigerant side to increase the energy efficiency.

Figure 4:
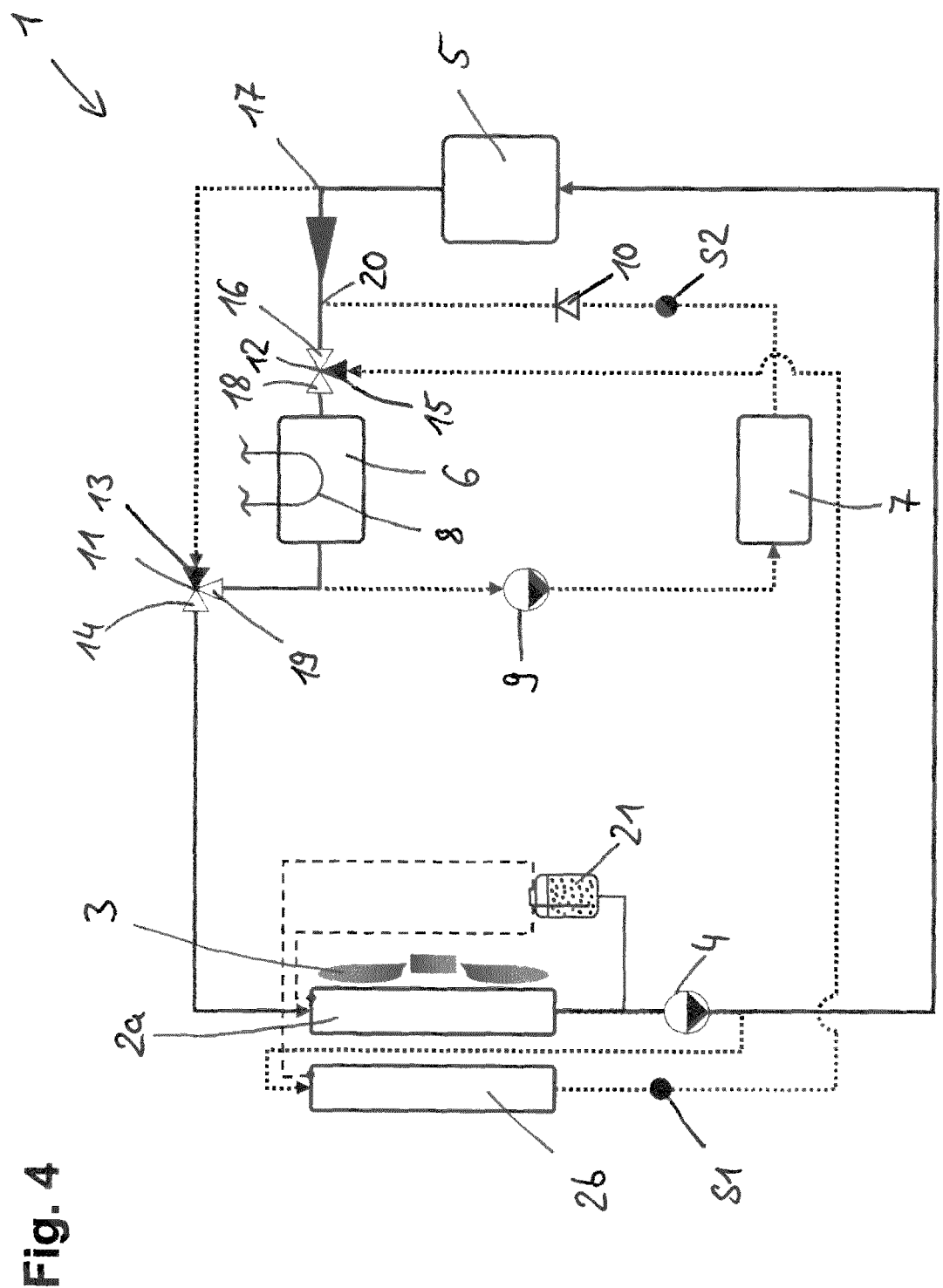
FIG. 4 illustrates a third mode of the cooling system from FIG. 1.

FIG. 4 illustrates a third mode. In the third mode, a main cooling circuit is formed in which, in the order recited below, coolant flows through the first ambient air cooler 2a, the first coolant pump 4, the heat source 5, the second control element 12, the chiller 6 and the first control element 11, in order to be led back from the first control element 11 to the first ambient air cooler 2a.

In order to form the main cooling circuit, the second control element 12 is switched such that the first inlet 15 is blocked and the second inlet 16 is opened, so that the second control element 12 is switched through from the second inlet 16 to the outlet 18. The first control element 11 is switched such that the second inlet 19 is opened and the first inlet 13 is blocked, so that the first control element 11 switches through from the second inlet 19 to the outlet 14.

In the third mode, the first ambient air cooler 2a, the heat source 5 and the chiller 6 are connected in series. The coolant pump 9 is not active, so that no flow through the energy storage device 7 takes place. In the third mode, heat or waste heat from the heat source 5 is transported to the chiller 6 and can be used for a heat pump application, i.e. via the chiller 6, the heat or waste heat from the heat source 5 can be introduced into the refrigeration circuit 8 and thus used for heating purposes via the refrigeration circuit 8. The third mode is expedient when there is no coolant demand for the energy storage device 7 and the heat from the heat source 5 or the ambient heat (which is absorbed by the ambient air cooler, as already described at the beginning) is to be used for a heat pump application.

While the invention has been illustrated and described in detail in the drawings and the preceding description, this illustration and description are to be understood as illustrative or exemplary and not as restrictive, and it is not intended to restrict the invention to the disclosed exemplary embodiment. The simple fact that specific features are recited in different dependent claims is not intended to indicate that a combination of these features could not also be used advantageously.

What is claimed is:

1. A cooling system for a motor vehicle, comprising:
an electrical energy storage device for driving the motor vehicle;
a chiller, through which a refrigeration circuit and, separated fluidically therefrom, a main cooling circuit can flow, in order to transfer heat energy between the refrigeration circuit and the main cooling circuit;
one or more control elements;
at least one heat source;
and one or more ambient air coolers, wherein
in a first mode, the control elements form the main cooling circuit such that said main cooling circuit flows through the chiller, the energy storage device and none of the ambient air coolers;

in a second mode, the control elements form the main cooling circuit such that said main cooling circuit flows through the chiller, the energy storage device and at least one of the ambient air coolers;

in a third mode, the control elements form the main cooling circuit such that said main cooling circuit flows through the chiller, at least one of the ambient air coolers and the heat source;

in the first mode and/or in the second mode, the control elements additionally form a secondary cooling circuit, which can flow through the heat source and at least one of the ambient air coolers; and in the first mode, an exchange of coolant between the main cooling circuit and the secondary cooling circuit is substantially suppressed.

2. The cooling system according to claim 1, wherein in the third mode, the chiller is arranged downstream of the heat source and upstream of the at least one ambient air cooler.

3. The cooling system according to claim 1, wherein a first control element is a three-way valve, of which a first inlet is connectable to an outlet of the heat source, a second inlet is connectable at least to an outlet of the chiller, and an outlet is connectable to an inlet of at least one of the ambient air coolers.

4. The cooling system according to claim 3, wherein a second control element is a three-way valve, of which a first inlet is connectable to an outlet of at least one of the ambient air coolers, a second inlet is connectable at least to an outlet of the heat source, and an outlet is connectable to an inlet of the chiller.

5. The cooling system according to claim 1, wherein in the second mode, the main cooling circuit opens into the secondary coolant circuit downstream of the energy storage device, so that the main cooling circuit and the secondary cooling circuit partly overlap.

6. The cooling system according to claim 1, wherein a check valve is provided downstream of the energy storage device.

7. The cooling system according to claim 1, wherein the heat source is at least one element selected from a group comprising: an electronic component, a power electronic component, an electric machine, an electric motor and/or a generator, an internal combustion engine, at least one secondary unit of the internal combustion engine, a coolant-air heat exchanger of a rear ventilation system, and an electric heater.

8. A motor vehicle comprising a cooling system according to claim 1.

* * * * *